Jan. 15, 1935.  K. L. CURTIS  1,988,165
SUCTION DEVICE
Filed July 2, 1932  2 Sheets-Sheet 1
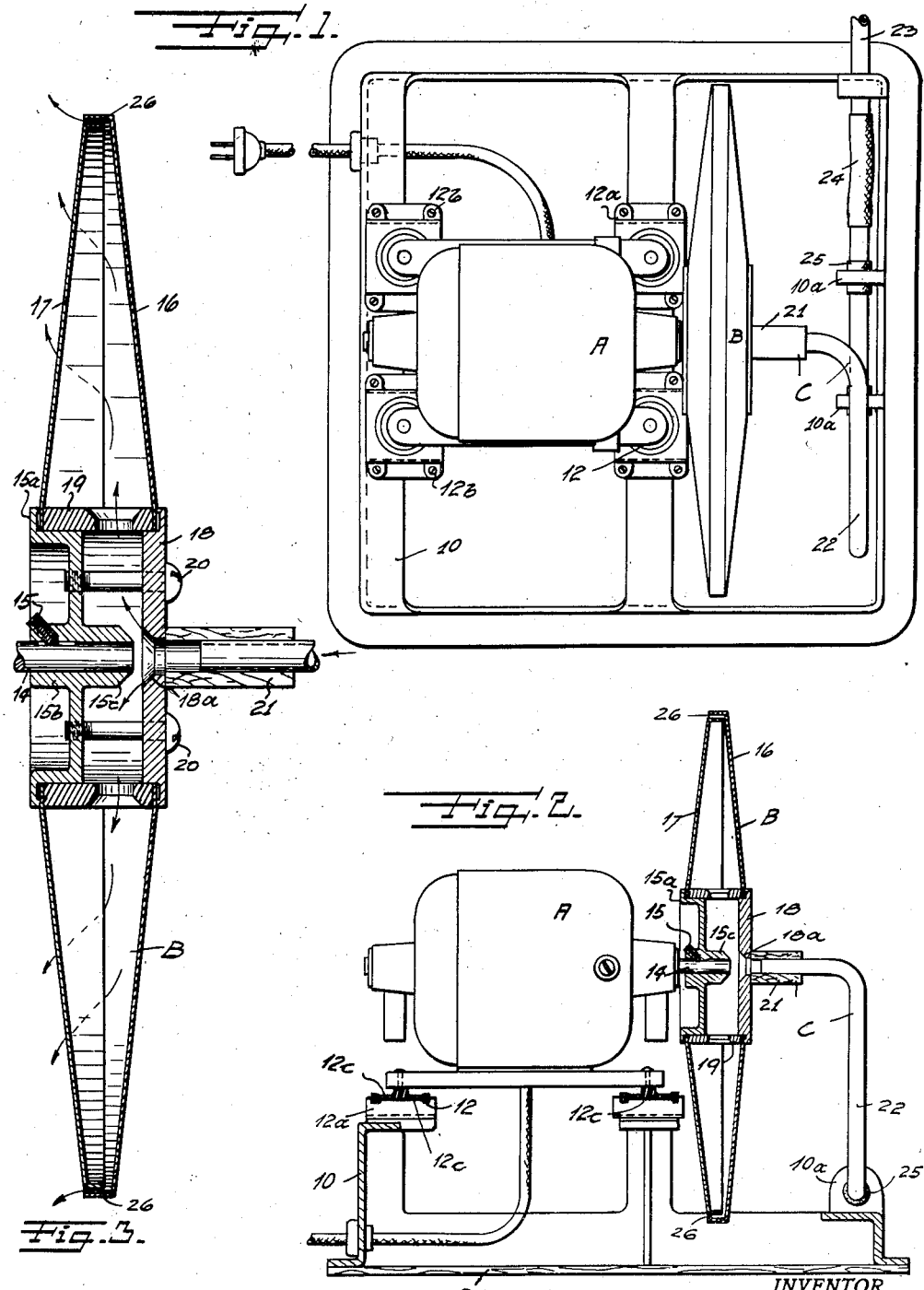
INVENTOR
KENNETH L. CURTIS
BY
ATTORNEY

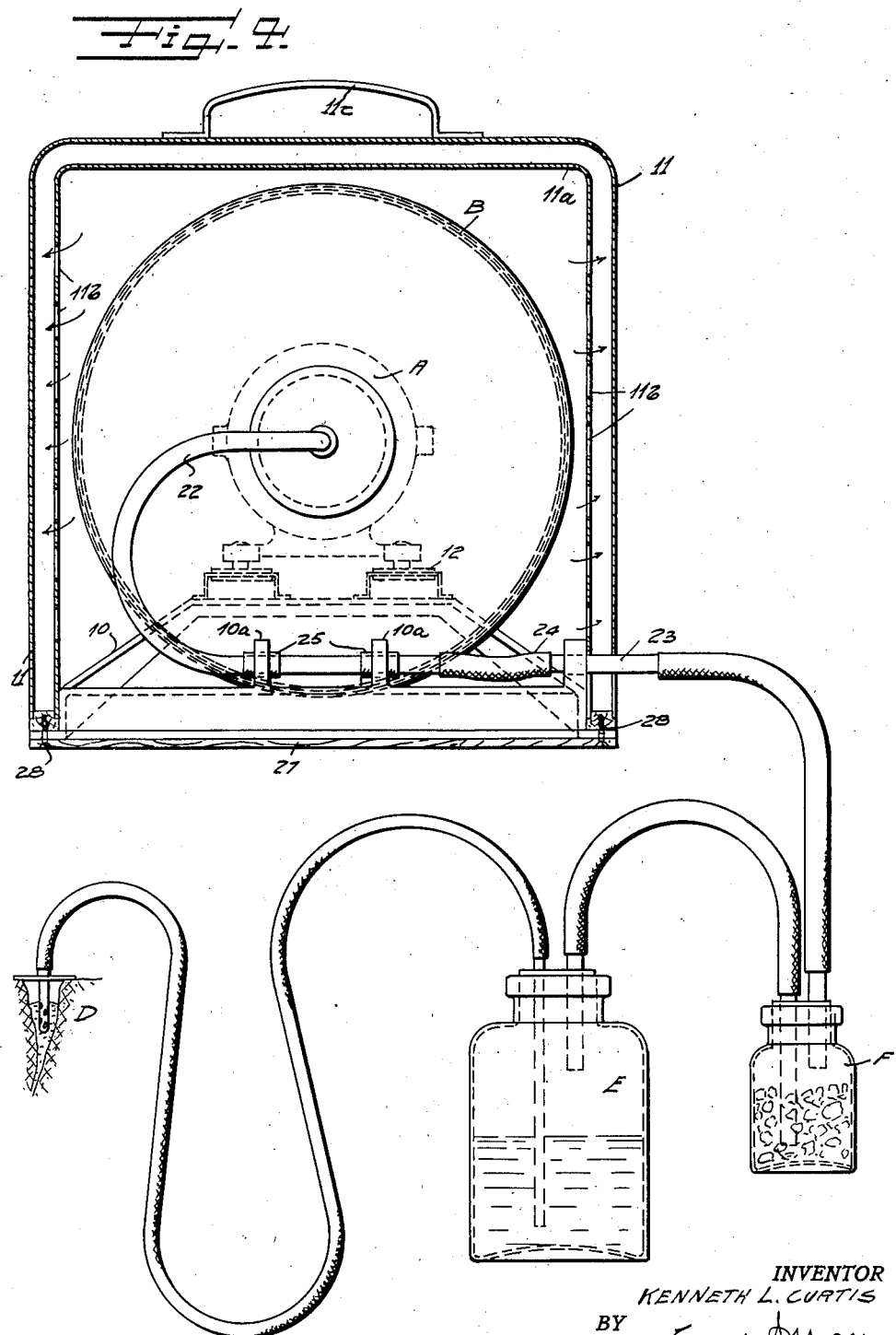

Patented Jan. 15, 1935

1,988,165

UNITED STATES PATENT OFFICE 1,988,165

SUCTION DEVICE

Kenneth L. Curtis, New York, N. Y.

Application July 2, 1932, Serial No. 620,626

4 Claims. (Cl. 230—126)

This invention relates to suction devices and it is especially useful in devices using mild suction and more particularly for machines which will be silent in operation and capable of running for long intervals without attention. The invention is especially useful in hospitals where drainage of wounds must go on night and day without the possibility of interruption and without distress to the patient, either by noise, vibration or excessive suction that could destroy tissue.

The invention consists in the novel features and combination which are hereinafter described by way of example in connection with the present preferred embodiment thereof, as shown in the accompanying drawings and in which:

Figure 1 represents a plan view, with cover removed, of the preferred form of embodiment of the device.

Figure 2 represents a partially sectional side elevation of Figure 1.

Figure 3 is an enlarged detailed view of the vacuum type suction mechanism.

Figure 4 represents a partly sectional end view of the device in combination with a surgical draining equipment.

The elimination of vibration and noises is, in many industries and institutions, especially sanatoriums and hospitals etc., of utmost importance. Due to operating conditions suction devices, in general, are accompanied by more or less prominent vibration and noises.

In my invention I aim to eliminate or subdue such noises and vibrations to a practically negligible amount by means of a specially designed and noiselessly operating vacuum suction device and also by suitably positioned sound and vibration absorbing means.

Figures 1, 2 and 4 illustrate the preferred form of embodiment of my invention comprising the power member A, preferably an electric motor, the vacuum suction member B and the suction coupling with the suction pipe structure C. All of these members are mounted upon a suitably arranged supporting frame 10 adapted to be securely joined to a sound proof cover or enclosure 11, see Figure 4, provided with a carrying handle 11c. Cover 11 completely encloses all of the operating members.

Power member A is joined to main frame 10 by means of suitably interposed resilient disk-pads 12. Each of these resilient disk-pads 12 is mounted upon a small supporting frame 12a, which in turn is secured to main frame 10, preferably by means of screws 12b. Resilient disk-pads 12, due to the flexible membrane portion 12c, serve to absorb vibration and noises emanating from the power member A.

Suction member B, being securely fastened to shaft 14, of power member A, by means of set screw 15, is actuated and forms one unit with power member A.

In Figure 3, suction member B is illustrated in larger scale to more clearly disclose the details of construction.

The principal parts comprising the suction member B are the air chamber formed by a conically shaped hollow disk member 16 and another similarly shaped and oppositely positioned hollow disk member 17 of somewhat smaller diameter to provide a passage for escaping air currents. Both members 16 and 17 are, at their centrally positioned wider base lines, securely held between the flanges of the hub member 15a, the clamp plate member 18 and the perforated space ring member 19. Screws 20 serve the purpose of securely clamping the structure together. Member 15a is provided with a centrally positioned hub portion 15b, terminating into an extended head portion 15c positioned oppositely of perforation 18a in clamp plate member 18.

Rotative suction member B is joined to the slightly swingingly but otherwise stationarily arranged, suction pipe structure C by means of an also stationary coupling member 21. Provision must be made to insure a perfect contact alignment between the stationary coupling member 21 and the rotative clamp disk member 18. With this provision and a material of self lubricating qualities for the coupling a perfect connecting joint is accomplished. Oil impregnated wood has been found to serve best for the purpose but any other material of similar characteristics may be satisfactorily adapted.

The suction tube structure C, comprises a suitably shaped metallic tube member 22, a stationary metal tube 23 and a flexible joining tube 24 preferably made of rubber or similar material. Bent tube member 22 is firmly yet slightly movable supported by means of resilient tubular cushion members 25, interposed between the tube member and lugs 10a forming a part of frame 10.

It may be observed that every precaution has been taken to positively prevent direct contact between any of the vibration and noise producing parts and the supporting members and suction tube equipment.

To still further eliminate transmission of vibrations and noises and at the same time render the complete equipment portable a special double shell enclosing case 11, whose inner shell member 11a is provided with a series of suitable perforations 11b located near the periphery of suction member B to permit the escape of the ejected air currents, is provided as indicated in Figure 4. Enclosing case 11 and a bottom padding plate 27 are rigidly but detachably held upon frame 10 by means of mounting screws 28, while a handle 11c, fastened to the case, permits portability.

The device functions as follows:

Suction member B, see Figures 2 and 3, being rigidly joined to the motor power member A is forced into a high speed rotary motion. Due to the high speed of rotation the air enclosed between the conical disk member 16 and 17 is carried along by surface friction and centrifugal force and allowed, at high velocity, to escape through the open space or passage 26 formed by the disk members. By thus forcing the air out of the enclosure a vacuum is created causing an inrush of air through the suction tube structure C and the air movement is clearly shown and indicated by arrows in Figure 3. It may also be noted that the stationary coupling member 21 is arranged to easily rest upon the rotatable disk member 18, this being accomplished by the slight pressure action of the resilient cushion members 25. Coupling 21 being in perfect alignment with disk member 18 is slightly pulled towards the disk member by the suction action of the device, thus preventing any appreciable leakage and due to the lubricating qualities of the material the wear on the engaging surfaces is negligible.

The importance of quietness and avoidance of vibration transmission in surgical work, especially where wounds must be drained uninterruptedly for long periods of time, is self evident. My suction device is designed to fully meet such requirements and Figure 4, schematically, illustrates a practical application of a wound D being drained by the suction equipment and the necessary auxiliary devices E and F.

Having thus fully described and illustrated my invention I do not wish to confine myself to the exact details of construction and arrangement of the various members as disclosed, it being apparent that there may be many variations and considerable modifications possible without departing from the spirit of my invention.

What I claim as new and desire to secure by Letters Patent is:

1. In suction apparatus the combination of a rotating air chamber, a pivotally disposed and axially movable air intake tube, and said movable intake tube held in contact with said rotating air chamber by the suction action of said air chamber.

2. In suction apparatus the combination of a rotating air chamber and a pivoted non-rotatable intake tube, said intake tube being held in contact with said air chamber by the suction created by the said rotating air chamber, and said non-rotatable intake tube being pivotally mounted on cushioning members.

3. In suction apparatus of the character described the combination of a rotatable air chamber, said rotatable air chamber completely enclosed and provided with a peripherally positioned air outlet-opening and an axially positioned air intake-opening, and a non-rotatable pivotally mounted air intake tube arranged to freely swing in close proximity to said air intake opening when said air chamber is at rest, and said intake tube to be sucked against said intake opening and thus form a continuous air passage when said air chamber is rotated.

4. In suction devices of the character described the combination of a rotatable air chamber, said rotatable air chamber completely enclosed and provided with a plurality of peripherally positioned air outlet holes and a suitable centrally and axially positioned air intake hole, and a pivotally mounted air intake tube arranged to freely swing in close proximity to said air intake hole when said air chamber is at rest, and said intake tube to be sucked against said intake hole and thus form a continuous air passage when said air chamber is rotated.

KENNETH L. CURTIS.